United States Patent
Iourcha et al.

(10) Patent No.: US 8,345,063 B2
(45) Date of Patent: Jan. 1, 2013

(54) FILTERING METHOD AND APPARATUS FOR ANTI-ALIASING

(75) Inventors: Konstantine Iourcha, San Jose, CA (US); Jason Yang, San Francisco, CA (US); Andrew Pomianowski, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 823 days.

(21) Appl. No.: 12/418,106

(22) Filed: Apr. 3, 2009

(65) Prior Publication Data

US 2009/0256848 A1    Oct. 15, 2009

Related U.S. Application Data

(60) Provisional application No. 61/042,608, filed on Apr. 4, 2008.

(51) Int. Cl.
*G09G 5/00* (2006.01)

(52) U.S. Cl. ..................... 345/611; 382/264

(58) Field of Classification Search .............. 345/611; 382/264
See application file for complete search history.

(56) References Cited

U.S. PATENT DOCUMENTS

| | | | |
|---|---|---|---|
| 6,999,100 B1 * | 2/2006 | Leather et al. | 345/611 |
| 7,817,165 B1 * | 10/2010 | Donham et al. | 345/619 |
| 2003/0095134 A1 * | 5/2003 | Tuomi et al. | 345/611 |
| 2005/0169531 A1 * | 8/2005 | Fan | 382/199 |
| 2007/0257935 A1 * | 11/2007 | Koduri et al. | 345/611 |

* cited by examiner

*Primary Examiner* — Maurice L McDowell, Jr.

(74) *Attorney, Agent, or Firm* — Volpe and Koenig, P.C.

(57) ABSTRACT

Embodiments of a filtering method and apparatus for anti-aliasing as described herein take advantage of improved existing hardware by using as input the data stored in the multi-sampling anti-aliasing (MSAA) buffers after rendering. The standard hardware box-filter is then replaced with a more intelligent resolve implemented using shader programs. Embodiments find scene edges using existing samples generated by Graphics Processing Unit (GPU) hardware. Using samples from a footprint larger than a single pixel, a gradient is calculated matching the direction of an edge. A non-linear filter over contributing samples in the direction of the gradient gives the final result.

15 Claims, 6 Drawing Sheets

FIG.6

FILTERING METHOD AND APPARATUS FOR ANTI-ALIASING

RELATED APPLICATIONS

This application claims the benefit of U.S. Provisional Patent Application No. 61/042,608, filed Apr. 4, 2008, which is incorporated by reference in it entirety herein.

TECHNICAL FIELD

Embodiments as disclosed herein are in the field of graphics data processing.

BACKGROUND

Aliasing is a fundamental problem of computer graphics. Anti-aliasing alleviates the problem of aliasing, or high-frequency noise due to undersampling. Current anti-aliasing techniques are typically expensive for real-time rendering, in particular for games. However, performance on modern graphics hardware has reached a point where anti-aliasing is not a luxury, but is an expected feature. For example, graphics benchmarking reviews indicate that 2× multisample anti-aliasing is now a minimum even for hardware in the mid-price ranges.

Several approaches to anti-aliasing have been developed. Known solutions typically employ a box filter over pixel sub-samples, which provides some improvement in the displayed result. Two popular approaches to anti-aliasing on modern graphics hardware are supersampling and multisample anti-aliasing (MSAA). Supersampling is typically performed by rendering the scene at a higher resolution and then downsampling to the target resolution. Supersampling is expensive in terms of both performance and memory bandwidth, however the results tend to have a high quality since the entire scene is rendered at a higher resolution. Downsampling is performed in a processing step called a resolve, which is the aggregation of the samples with filtering. MSAA is an alternative to supersampling and is the predominant method of anti-aliasing for real-time graphics on current consumer GPUs. A third approach was also recently introduced, called coverage sampling which aims to produce a quality level similar to MSAA but with a reduced memory requirement.

Figure 1A:
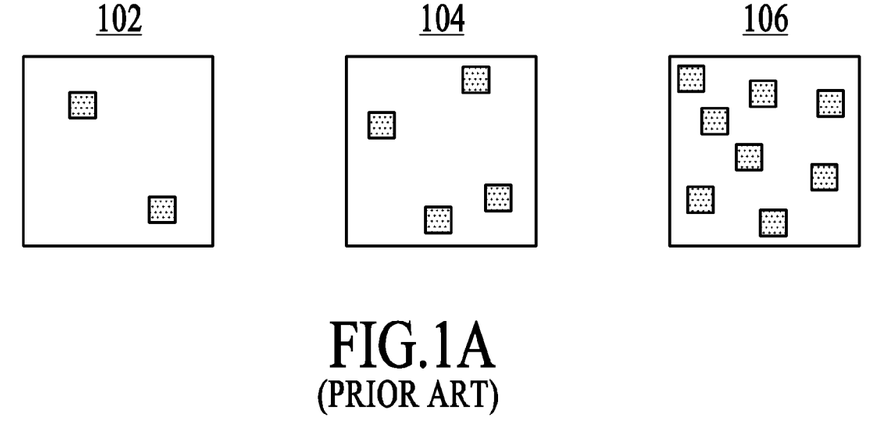
FIG. 1A is a diagram of example anti-aliasing patterns in the prior art.
Figure 1B:
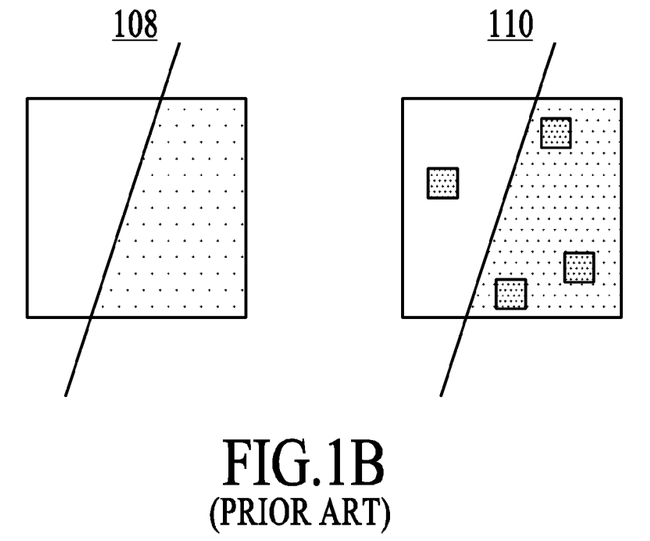
FIG. 1B is a diagram showing the area contribution by a primitive, and the area approximated by using sub-pixel samples in MSAA.

In a multisampling approach whenever one or more subsamples in a pixel are covered by a polygon, then a single color contribution of the polygon is calculated for that pixel, and this color value is stored for each covered subsample location. We will refer to the buffer in which this data is stored as the MSAA color buffer. If depth-buffering is being performed then a unique depth value is also calculated for each subsample and is stored in an MSAA depth buffer. When the scene is ready for display, a resolve is performed (typically only the MSAA color buffer is resolved, since the depth information is not displayed on screen). In most implementations, a simple box filter is used that averages the subsample information. Hardware MSAA modes are characterized by the pattern of the sampling grid. Most graphics hardware units employ a non-uniform grid. FIG. 1A shows example anti-aliasing patterns 102, 104, and 106. In FIG. 1B, the left pixel 108 shows the area contribution by a primitive. In MSAA, the area is approximated by using sub-pixel samples, as shown in pixel 110.

It is possible to increase the quality of images by simply increasing the number of samples. However, as the number of sample increases, memory and processing costs greatly increase. It would therefore by desirable to provide a method to improve anti-aliasing quality by advantageously use existing graphics processing hardware without increasing the number of samples.

The drawings represent aspects of various embodiments for the purpose of disclosing the invention as claimed, but are not intended to be limiting in any way.

DETAILED DESCRIPTION

Through the evolution of graphics hardware, as the power and flexibility of programmable units increases, more fixed-function operations are being implemented using shader programs. It has already been shown that many post-rendering effects can be implemented on these shader units (e.g., motion blur). Embodiment as disclosed herein include a programmable anti-aliasing (AA) functionality including improved filtering software and improved use of hardware resources that improve anti-aliasing and image quality without increasing the number of samples.

The latest generation of graphics hardware provides direct access to multisample anti-aliasing (MSAA) rendering data. By taking advantage of the pixel subsample values, an intelligent reconstruction filter can be computed using programmable graphics processing unit (GPU) shader units. Embodiments include an adaptive anti-aliasing filter for real-time rendering on the GPU. Improved quality is achieved by using information from neighboring pixel samples to compute both an approximation of the subpixel position and normal direction of a primitive edge within a pixel.

Embodiments of a filtering method and apparatus for anti-aliasing as described herein take advantage of improved existing hardware by using as input the data stored in the MSAA buffers after rendering. The standard hardware box-filter is then replaced with a more intelligent resolve implemented using shaders. Embodiments find scene edges using existing samples generated by Graphics Processing Unit (GPU) hardware. Using samples from a footprint larger than a single pixel, an approximation of the edge position and edge normal direction is calculated. A non-linear filter over contributing samples in the direction of the normal gives the final result.

Figure 2:
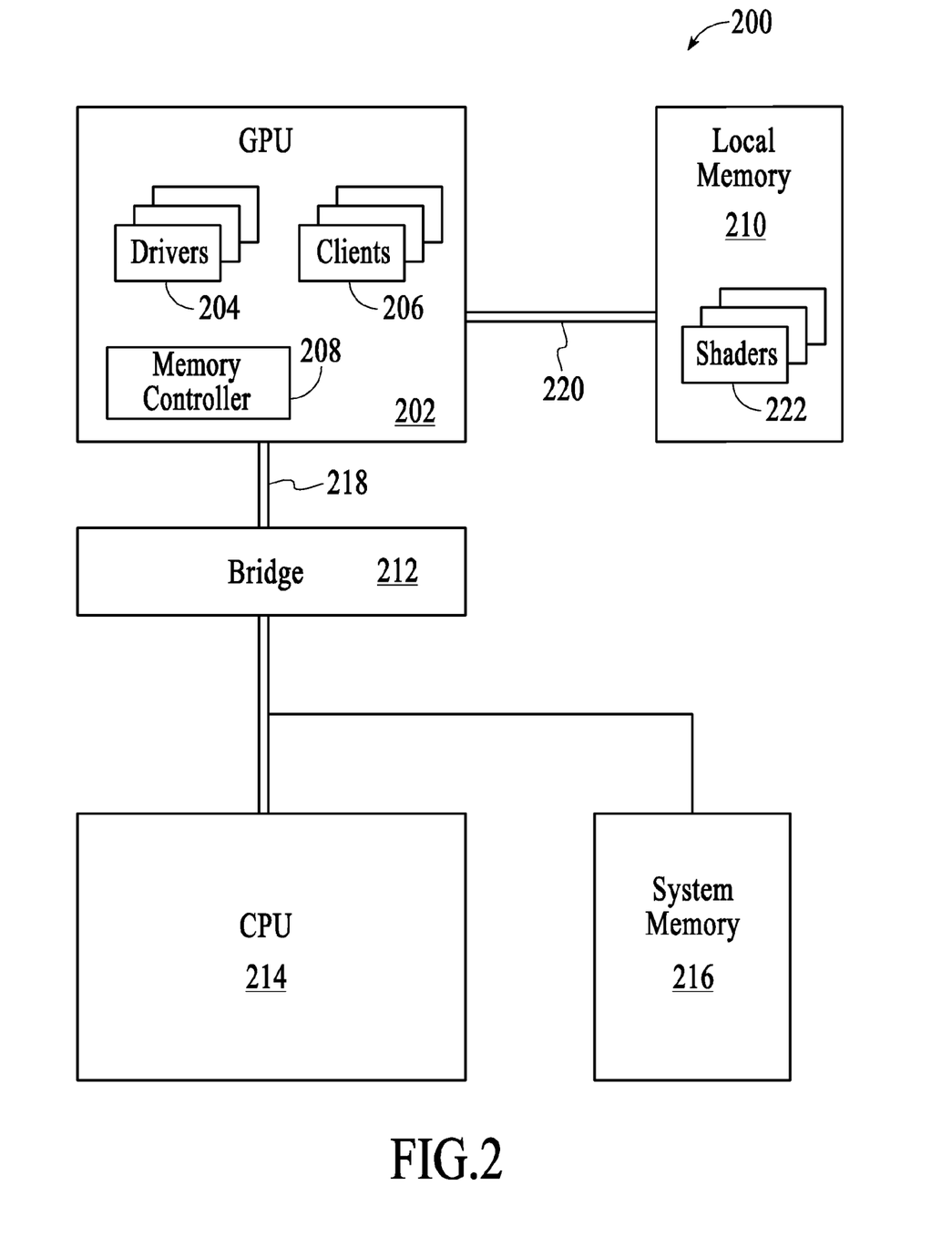
FIG. 2 is a block diagram of various components of a system that includes a GPU and CPU.

FIG. 2 is a block diagram of various components of a system 200 that includes a GPU 202 and a CPU 214. FIG. 2 shows an example of a system embodying the disclosed and claimed invention, and is not intended to be limiting. The GPU 202 includes various drivers 204, a memory controller 208 and various clients 206. The clients 206 communicate with the memory controller 208. The memory controller 208 controls access to a local memory 210 (for example a video memory), by clients 206, and controls access to bus 218 by clients 206. More specifically, the memory controller 208 determines which clients 206 communicate with local memory 210 and which clients 206 communicate with bus 218 and when. In an embodiment, the local memory 210 stores multiple shader programs 222 as further referred to herein. However, in other embodiments, the shader programs may be stored on-chip on the GPU 202. In yet other embodiments, shaders 222 may be stored on a system memory 216 accessible via the bus 218 through a bridge 212. In yet other embodiments, the shaders 222 may be stored on a combination of memory devices in the system.

Edge-Guided, Directionally Adaptive Anti-Aliasing Filter: Overview Anti-Aliasing Framework In computer graphics, the jagged appearance of edges on objects—"jaggies", caused by the finite resolution of the display device is referred to as aliasing. More precisely, aliasing refers to a phenomena where a high frequency signal is sampled at a rate that is too low for the signal to be correctly reconstructed by filtering. The high frequency signal after filtering then appears in the reconstructed data as a lower frequency signal (the high frequency data "aliases" to a lower frequency and appears as noise in the image). Undesirable aliasing artifacts in computer graphics can come from multiple sources during the process of rendering, and anti-aliasing tries to remove the visible effects of aliasing from the image using frame-buffer operations. Embodiments described include a filter that achieves this goal. The following discussion is focused on digitizing a signal into a frame-buffer for display. Without any anti-aliasing ("AA"), a model of digitizing and displaying a continuous signal $f=f(v)$ in RGB space, where v is position [x, y] in continuous screen space, is:

$$f'_{LCD} = (f \cdot D_{comb}) * \text{box}_{LCD} \qquad \text{Equation (1)}$$

$D_{comb}$ is a Dirac comb (impulse train), represents a continuous convolution, and $\text{box}_{LCD}$ is a box filter kernel corresponding to a display pixel, assuming a LCD display of relatively low resolution (in CRT displays, pixels are not independent and can bleed into neighboring pixels vs. discrete elements on an LCD. If f is not properly bandlimited to half the sampling rate (Nyquist theorem), then sampling with $D_{comb}$ will introduce aliasing. In the frequency domain, the fourier transform $\hat{f}$ of f is convolved with the transform of $D_{comb}$, which is another Dirac comb. The overlap between replicas of $\hat{f}$ is noise from undersampling. The general model of AA is then $$((f*\text{filter}) \cdot D_{comb}) * \text{box}_{LCD} \qquad \text{Equation (2)}$$

where filter is used as a prefilter to bandlimit f and reduce noise. Typically in graphics, a box filter is used for filter, which corresponds to integration of the signal over a pixel. It can be argued that the box as a prefilter is not desirable and a more bandlimiting filter should be used. However, filters with a smaller passband are not always desirable for game graphics due to the blurring effects, and typically they are more expensive to calculate. An embodiment is based on the use of a box filter, but is extendable to different prefilters. One goal for anti-aliasing is to estimate the result of f*box or the integral of f over a pixel. In practice one does not have a continuous f but rather samples of f based on a supersampling or MSAA grid. These grids are usually non-uniform, but the algorithm as described herein works with any grid.

Algorithm Overview

In an embodiment the later stages of the algorithm are applied to pixels that are partially covered by primitives (i.e., edge pixels). Pixels that are fully covered by a primitive are detected in the early stages of the algorithm and processed in the typical manner. Fully covered (interior) pixels are usually textured and texture edges are ignored because they can be pre-filtered or processed by other means. For pixels that are partially covered, those in the middle of long edges (those that extend across several pixels) are of the most interest, where jaggies are most visible. Assuming that the edge does not have high curvature at the pixel, then the signal can be approximated in the neighborhood of the pixel by the function.

$$f(v) \approx \tilde{f}(\langle g,v \rangle) \qquad \text{Equation (3)}$$

where $\tilde{f}:R^1 \to R^3$ is a function of a scalar argument into color space and $g, v \in R^2$ is the gradient approximation and the point position [x,y] respectively. g is a constant in the local neighborhood. $\langle , \rangle$ represents a dot product.

Stochastic Integration

Under the assumption of equation (3), the following approximation can be used. A gradient-aligned rectangle, which approximately aligns with isolines, is constructed by taking a circumscribed square around the pixel with two sides orthogonal to g and extruding it in the direction orthogonal to g until it meets with the boundary of the 3×3 pixel grid centered at the pixel.

Now consider all the sample positions $v_i$ within the rectangle. To calculate the weight $w_i$ of a sample $v_i$, under the assumption of (3), we take a line passing through the sample orthogonal to g (s.t. $\langle g, v \rangle) = \langle g, v_i \rangle$. The computed weight $w_i$ is equal to the length of the segment of this line enclosed by the pixel. The total result for the pixel is then $$\frac{\sum f(v_i) \cdot w_i}{\sum w_i} \qquad \text{Equation (4)}$$

Figure 3:
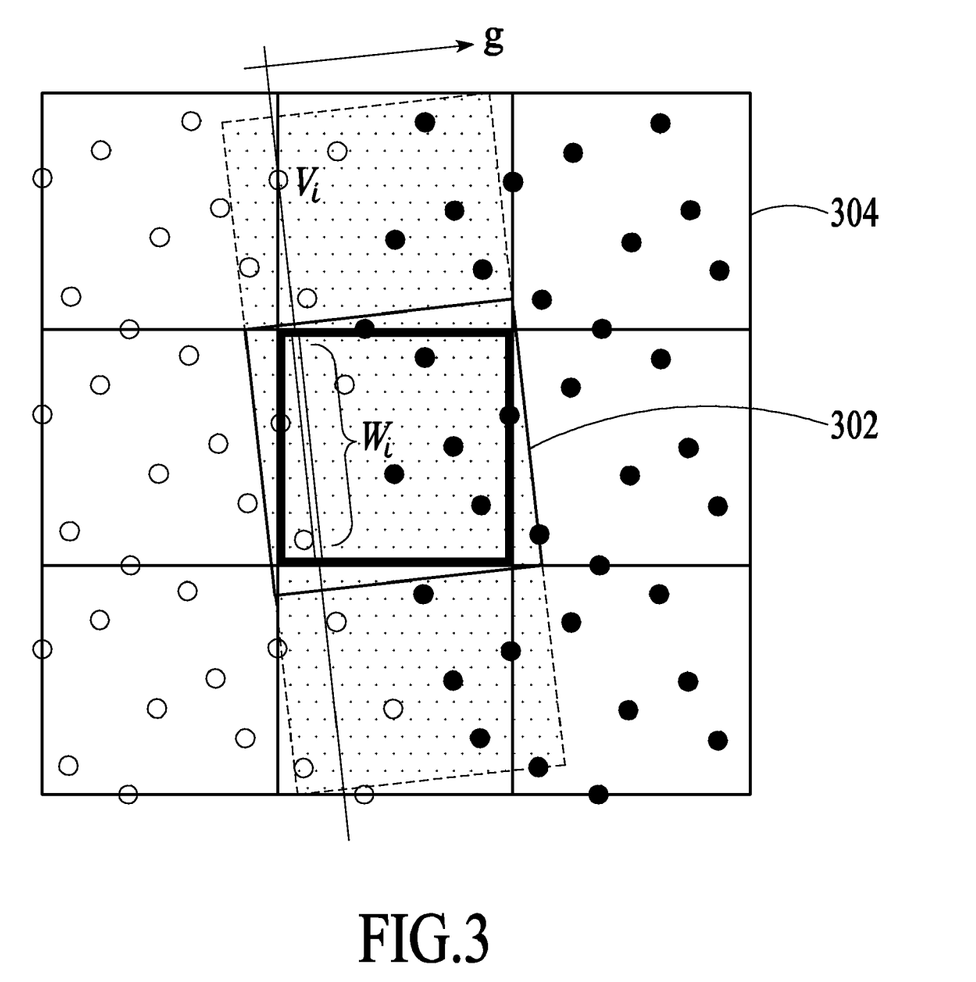
FIG. 3 is a diagram illustrating an integration model according to an embodiment.

An integration model is illustrated in FIG. 3: 1) Construct a square 302 around the pixel, with two sides orthogonal to $g(\perp g)$; 2) Extend the rectangle, in the direction $\perp g$ until it meets the 3×3 pixel boundary 304; 3) For every sample $v_i$, the line segment, from the line passing through the sample and $\perp g$, enscribed by the pixel is the weight $w_i$; and 4) Using eq. (4) the pixel color is calculated.

Increasing the number of samples, provided they are uniformly distributed, can give a better integral approximation. However, the rectangle should not be increased too far because the edge in the actual scene might not extend that far out. Alternatively, the weights could be reduced for samples further from the pixel, but visually, and as shown in experiments, the weighting as described works well and provides good performance for the achieved quality.

Gradient Calculation

To implement this integration model pixels applicable to the model are found, as well as the approximate gradient for the edge. For some pixels, different color channels might have different actual gradients, but according to an embodiment, the goal is to find a reasonable approximation (eq. 3).

Using f(v) from above, we find an approximation to the gradient by fitting a linear function to the color samples $$F = \sum \|(C_1 \cdot \langle g, v_i \rangle + C_0) - f(v_i)\|^2 \qquad \text{Equation (5)}$$

where $C_1, C_0 \in R^3$ are some constant colors (RGB) and $f(v_i)$ are the color samples. We find an approximation to the gradient by minimizing F over $C_1, C_0$, and g using standard least squares techniques. If the solution for g is not unique or equal to zero then we ignore the pixel.

Although the accuracy of our integration is dependent on the accuracy of the gradient approximation, we found that errors resulting from error in the gradient estimates still produced suitable results. Unlike differencing approaches to edge detection, our gradient approximation is less sensitive to noise.

Figure 4:
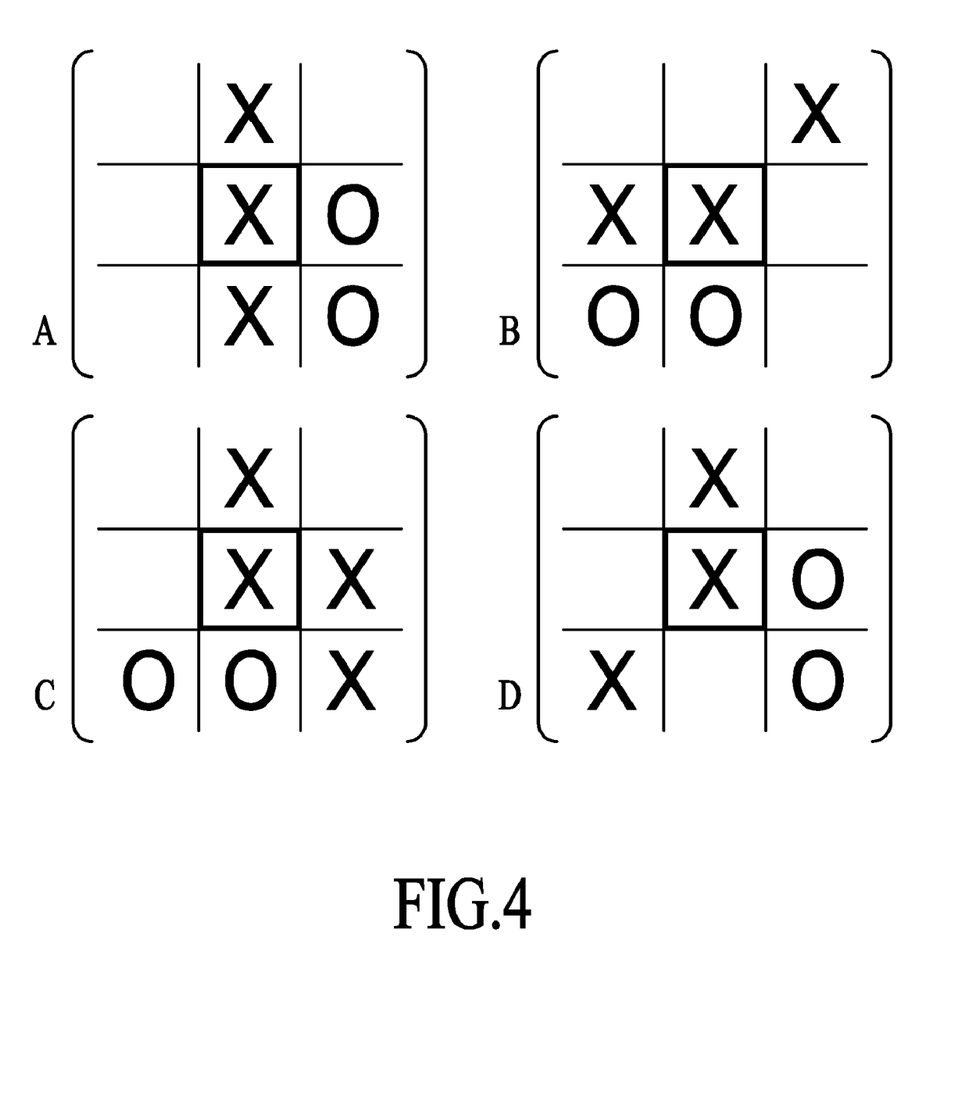
FIG. 4 is a diagram showing example pattern masks A, B, C, and D, which are used to eliminate potential problem pixels according to an embodiment.

FIG. 4 is a diagram showing example pattern masks A, B, C, and D, which are used to eliminate potential problem pixels. X's represent edges and O's represent non-edges. Empty grid spaces can be either edge or non-edge. The edge pixel (at center) would be eliminated from processing if its neighbors do not match one of the patterns.

Thresholding

Of concern are edges of high curvature (i.e., corners) where unique solutions of the above least squares problem still exist. Since we assume isolines are locally straight or have low curvature, filtering hard corners with our integration method may cause undesired blurring. To reduce potential blurring from these cases, we can reject pixels from further processing by using the following threshold where $$\delta(v) = f(v) - (C_1 \cdot \langle g, v \rangle + C_0) \qquad \text{Equation (6)}$$

$$\frac{\|\delta(v)\|}{\|f(v) - C_0\|} \leq \text{threshold} \qquad \text{Equation (7)}$$

The pixel passes if eq. (7) holds using a threshold that is relatively small. This would imply that the approximation of eq. (3) is valid. We can also control the amount of blurring by adjusting the threshold.

Masking

Earlier, we used thresholding from eq. (7) to eliminate potential problem pixels. As an optimization, we can further eliminate candidate pixels by looking at edge patterns within an image. This process is targeted to exclude cases of high isoline curvature to prevent loss of details as well as non-edge pixels to improve performance. In our implementation, this would occur before finding the gradient.

A 3×3 grid pattern of edge and non-edge pixels, centered around the candidate pixel, are matched against desired patterns. For example, if all pixels in the 3×3 grid are classified as edges, then the candidate pixel is most likely an interior edge and rejected for later processing. Another example is a corner (a 2×2 area of edges), which does not fit the long edge model. FIG. 3 shows a subset of the pattern masks used to classify edges for processing.

Any pixels that have been rejected during the entire process are resolved using the standard box filter resolve. In our experiments, we found that pixels evaluated with our method neighboring those of the standard resolve produced consistent color gradients along edges.

Implementation and Performance

In an implementation according to an example embodiment, four shader passes are used corresponding to each part of the filtering algorithm. Shaders were developed using DirectX HLSL Pixel Shader 4.1. All parts of the algorithm are computed in the shader with no external tables. Weights are computed dynamically.

Embodiments of the algorithm scale with the number of shader processors, so future hardware improvements and features would also improve the rendering time.

Example Implementation

For an embodiment, the anti-aliasing method is implemented on ATI Radeon HD 2900 series and ATI Radeon HD 3800 series graphics processing hardware (a special-purpose graphics processor), but embodiments are not so limited. The implementation includes "custom filter" anti-aliasing modes for the hardware. Advanced anti-aliasing filtering uses shaders with existing MSAA samples. On 4×AA and 8×AA buffers, up to 12 and 24 samples respectively are used in the filter.

Conceptually, the algorithm can be viewed as different stages, including: edge finding; gradient calculation; and resolve/filtering. The following only describes one example implementation, but other implementations are within the scope of the claimed invention, for example, the algorithm is adjustable to trade off performance for quality or vice versa.

EdgeMask

This stage identifies only those pixels that are edges. A non-edge pixel is characterized by all the samples in the MSAA buffer for that pixel being the same. Edge pixels are everything else (e.g. at least one sample difference).

FilterMask

This stage identifies all edge pixels—in order to increase the speed of later processing stages and to avoid the possibility of introducing undesirable artifacts into the final image it is desirable to only apply the anti-aliasing filter to silhouette pixels of objects. Internal edges of geometry and objects such as fonts should therefore be avoided by the later stages of the algorithm as much as possible. This step refines the edges that were identified by looking at the surrounding pixels. One embodiment looks at the surrounding eight pixels, and based on certain pixel patterns can change the classification for the pixel being analyzed.

Gradient

This stage calculates the gradient of the filter. A gradient can be found by fitting a plane to all the 3*3*n samples in a 3×3 pixel area. This is done by minimizing the following and solving for the gradient:

$$\min \Sigma |\text{Color}(x) - V(g,x)|^2 \qquad \text{Equation (8)}$$

A preprocessing step can be used to calculate the sum of each component and the magnitude of the color vector.

Ed_g

This stage performs the actual filtering of the samples. Either the advanced filter or the standard resolve (average) is applied at the pixel.

Figure 5:
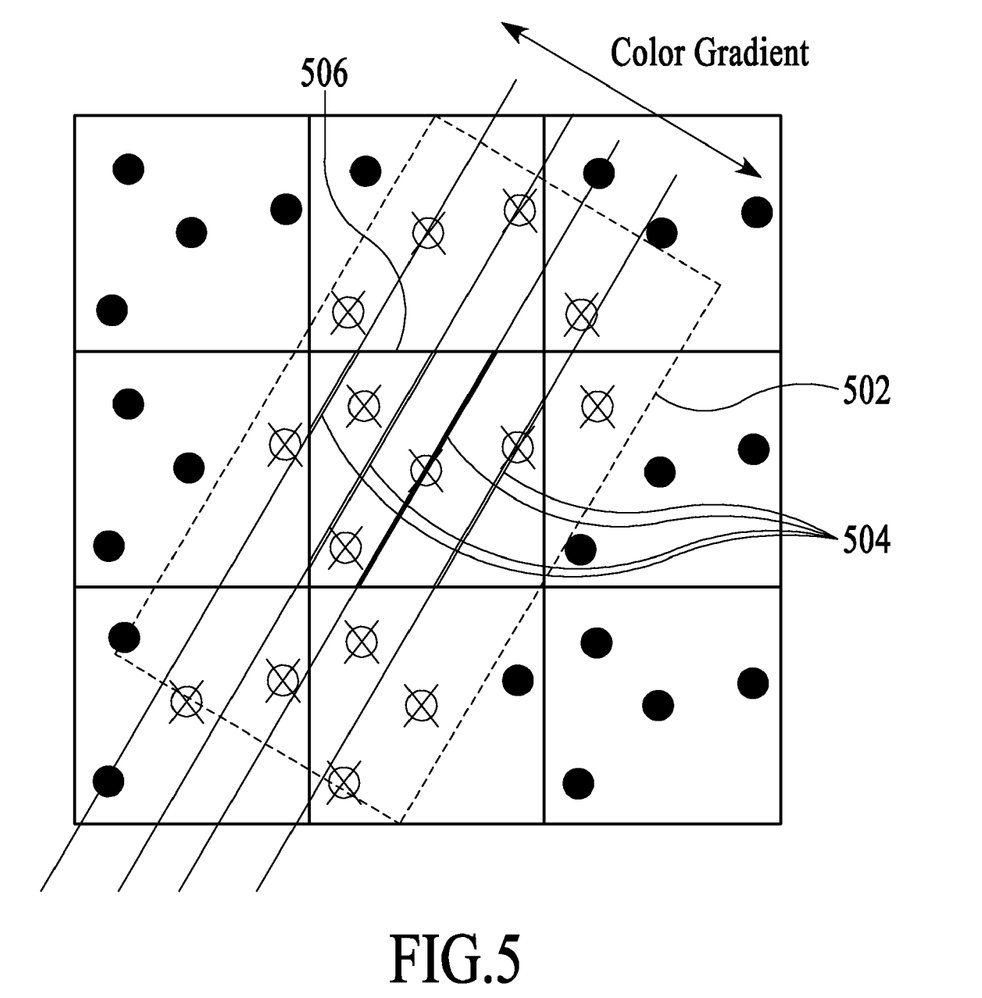
FIG. 5 is a diagram illustrating an integration model according to an embodiment.

Ramp thresholding is used before filtering to determine if there is enough of a ramp to warrant filtering. Since the exact ramp cannot be reconstructed an average one is fitted to the samples. FIG. 5 is a diagram illustrating an integration model according to an embodiment. Referring to FIG. 5, the rotated box 502 is the kernel. Samples represented by an "X", and weights are shown as hatched lines 504.

Any pixel that was previously classified as edge and passes the threshold is filtered using the advanced filter kernel, or edge pixel filter. All other pixels use a standard resolve.

For advanced filtering, weights are assigned to the samples and combined. Currently, the filter kernel used is a rectangle that encloses the interested pixel and bounded when the edges intersect the 3×3 pixel grid. FIG. 4 is an example. This is a non-linear filter calculated using stochastic integration. In FIG. 5 the weights are determined by the length of the hatched line 504 enclosed by the pixel 506. Effectively the weight for a sample is scaled by the distance from the center line (largest weight).

Driver Implementation and Optimizations

In one embodiment of an actual driver implementation some of the stages may be collapsed to amortize the memory bandwidth. The depth buffers are also used to kill pixels. Also, gamma and degamma are used in reading the MSAA samples and writing the final output to match the standard anti-aliasing implementation.

The sample positions are obtained directly from the driver so that if the positions are changed it is automatically reflected in the shaders.

Pre-Passes

Decompress the color buffer and clear the Edgemask buffer.

Figure 6:
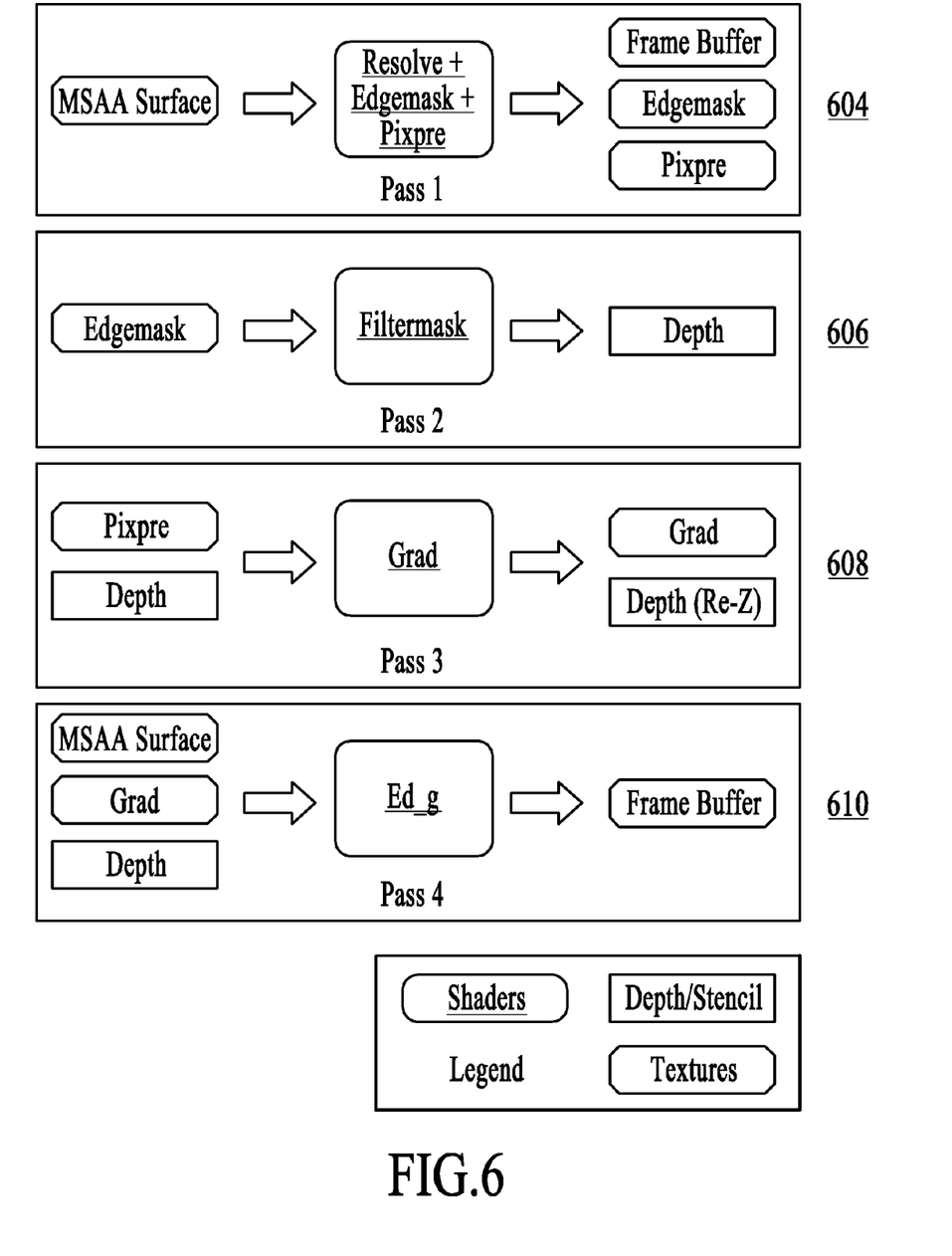
FIG. 6 is a diagram illustrating various driver passes according to an embodiment.

FIG. 6 is a diagram illustrating various driver passes according to an embodiment.

Pass 1 (604)

In the shader, the standard resolve, edge detect (if min/max are not equal), and pixpre are calculated simultaneously. These steps have overlapping operations and also the samples will only need to be read here once until the final pass.

As an optimization, maximum (max) difference thresholding (MDT), not to be confused with the previously described ramp thresholding, is also used to kill possible interior pixels in an embodiment. The idea is that if the difference between the min and max samples is lower than a certain threshold, the pixel is most likely an interior pixel. Even if the sample is misclassified, more than likely the advanced filter would not have improved the results since the samples are so close together in color. In an embodiment, this threshold is set through a constant.

At this point, the frame buffer should match the standard AA resolve buffer. Since the samples are already read and the instructions to do the standard resolve are almost the same as the pixpre calculation, the rendering cost is just an extra multiply and a write. The added benefit is that an extra branch is not needed in the final shader (pixels to be rendered is dramatically reduced) and also if there are any misclassifications the worst result that can happen is that which would be obtained by the standard resolve.

Pass 2

This pass 606 only outputs a depth buffer. This and subsequent passes will kill edge pixels using the viewport.

To prevent possible misclassification of non-edge pixels using the threshold in the last pass, if an edge pixel touches a MDT non-edge pixel, the pixel may be reclassified as edge. Although there is a danger that this is a further mis-classification, for example when a singleton edge which would have been turned off in this pass touches a MDT non-edge. The worst consequence of this is a decrease in performance.

Pass 3 (608)

In an embodiment, the depth buffer is used to mask active and inactive pixels. Active pixels are defined as those for which further processing stages are needed, inactive pixels are ones for which no further processing is needed. The depth buffer in pass 608 will early-Z kill pixels in this pass. The grad shader also contains the ramp thresholding from the ed_g step described earlier which can further eliminate some pixels, so by using Re-Z and shader texkill, an additional Z-plane can be created for the next pass. (The Re-Z feature performs an early-Z and a secondary late Z operation.)

Pass 4 (610)

From 1 (604), the frame buffer has already been seeded with standard AA resolve values. In pass 610, using the depth buffer and z-equal to the z-plane created in pass 4 (608), only the pixels requiring the advanced AA filtering are rendered.

Embodiments provide the advantage of simultaneously killing pixels by early-Z and writing to Z. This optimizes all the passes by progressively refining the pixel to be rendered, therefore rendering time is dependent on the number of pixels touched by edges in a frame. Another advantage of the methods described is faster color buffer decompression.

Aspects of the embodiments described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices, and standard cell-based devices, as well as application specific integrated circuits (ASICs) and fully custom integrated circuits. Some other possibilities for implementing aspects of the embodiments include microcontrollers with memory (such as electronically erasable programmable read only memory (EEPROM), Flash memory, etc.), embedded microprocessors, firmware, software, etc. Furthermore, aspects of the embodiments may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies such as complementary metal-oxide semiconductor (CMOS), bipolar technologies such as emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word, any of the items in the list, all of the items in the list, and any combination of the items in the list.

The above description of illustrated embodiments of the method and system is not intended to be exhaustive or to limit the invention to the precise forms disclosed. While specific embodiments of, and examples for, the method and system are described herein for illustrative purposes, various equivalent modifications are possible within the scope of the invention, as those skilled in the relevant art will recognize. As an example, although the anti-aliasing is generally described herein as an algorithm executed on hardware as a series of steps, the steps may be executed in an order other than the order described. In addition, the particular hardware or software components named, such as drivers, depth buffer, etc. are not meant to be exclusive or limiting.

The teachings of the disclosure provided herein can be applied to other systems, not only for systems including graphics processing or video processing, as described above. The various operations described may be performed in a very wide variety of architectures and distributed differently than described. In addition, though many configurations are described herein, none are intended to be limiting or exclusive.

In other embodiments, some or all of the hardware and software capability described herein may exist in a printer, a camera, television, a digital versatile disc (DVD) player, a DVR or PVR, a handheld device, a mobile telephone or some other device. The elements and acts of the various embodiments described above can be combined to provide further embodiments. These and other changes can be made to the method and system in light of the above detailed description.

In general, in the following claims, the terms used should not be construed to limit the method and system to the specific embodiments disclosed in the specification and the claims, but should be construed to include any processing systems and methods that operate under the claims. Accordingly, the method and system is not limited by the disclosure, but instead the scope of the method and system is to be determined entirely by the claims.

While certain aspects of the method and system are presented below in certain claim forms, the inventors contemplate the various aspects of the method and system in any number of claim forms. For example, while only one aspect of the method and system may be recited as embodied in computer-readable medium, other aspects may likewise be embodied in computer-readable medium. Computer-readable media include any data storage object readable by a computer including various types of compact disc: (CD-ROM), write-once audio and data storage (CD-R), rewritable media (CD-RW), DVD (Digital Versatile Disc" or "Digital Video Disc), as well as any type of known computer memory device. Such computer readable media may store instructions that are to be executed by a computing device (e.g., personal computer, personal digital assistant, PVR, mobile device or the like) or may be instructions (such as, for example, Verilog or a hardware description language) that when executed are designed to create a device (GPU, ASIC, or the like) or software application that when operated performs aspects described above. Accordingly, the inventors reserve the right to add additional claims after filing the application to pursue such additional claim forms for other aspects of the method and system.

What is claimed is:

1. A graphics processor adapted to access a memory device, the memory device including instructions stored thereon, which when executed on the graphics processor perform an anti-aliasing method of processing graphics data, the method comprising:
   classifying pixels into one or more groups based on values of pixel samples, and on values of pixel samples of a surrounding neighborhood; and
   filtering each group of pixels with a filter specific to that group, wherein a group is classified as edge pixels, and wherein the method further comprises determining an approximation of an edge direction for edge pixels.

2. The graphics processor of claim 1, wherein the samples comprise samples generated using one or more anti-aliasing methods selected from a group comprising supersampling, multisampling, and coverage sampling.

3. The graphics processor of claim 1, wherein the approximation of an edge direction for edge pixels comprises an approximation of an edge normal direction.

4. The graphics processor of claim 1, wherein calculating the approximation of the edge direction comprises fitting a linear function to values of samples.

5. The graphics processor of claim 4, further comprising reclassifying edge pixels as either edge or non-edge pixels by evaluating the accuracy of the approximation.

6. The graphics processor The-method of claim 5, further comprising generating a mask of active and inactive pixels.

7. The graphics processor of claim 5, further comprising applying a filter to the samples taken from each edge pixel, and from that edge pixel's neighborhood to calculate a pixel value.

8. The graphics processor of claim 7, wherein the filter recovers edge position by utilizing sample weights calculated based on the approximation of the edge normal direction.

9. The graphics processor of claim 1, further comprising using maximum difference thresholding (MDT) to classify pixels.

10. The graphics processor of claim 9, further comprising reclassifying an MDT non-edge pixel as an edge pixel if the MDT non-edge pixel touches an edge pixel.

11. A system comprising:
   a graphics processor; and
   a memory device accessible by the graphics processor, the memory device having instructions stored thereon including shader programs, which when executed on the graphics processor perform an anti-aliasing method, the method comprising,
   classifying pixels into one or more groups based on values of pixel samples, and on values of pixel samples of a surrounding neighborhood; and
   filtering each group of pixels with a filter specific to that group wherein a group is classified as edge pixels and wherein the method further comprises determining an approximation of an edge normal direction.

12. The system of claim 11, wherein the samples comprise samples generated using one or more anti-aliasing methods selected from a group comprising supersampling, multisampling, and coverage sampling.

13. A system comprising:
   a graphics processor; and
   a memory device accessible by the graphics processor, the memory device having instructions stored thereon including shader programs, which when executed on the graphics processor perform an anti-aliasing method, the method comprising,
   receiving anti-aliasing pixel samples;
   edge masking, comprising identifying non-edge pixels among the samples;
   filter masking, comprising identifying edge pixels among the samples;
   filtering the edge samples using a derived filter based on the normal direction of the edge for each edge pixel, and filtering the non-edge samples using a standard filter algorithm;
   a software driver, wherein the anti-aliasing method is performed by the driver using a plurality of rendering passes on the graphics processor, comprising a first pass that passes only tiles that do not contain edge pixels.

14. The system of claim 13, wherein the plurality of rendering passes further comprises a second pass that passes only tiles that contain at least one edge, and wherein a shader calculates a standard resolve, and identifies edge pixels concurrently.

15. The system of claim 14, wherein the second pass includes maximum difference thresholding (MDT) performed to kill possible interior pixels.

* * * * *